US008850340B2

(12) United States Patent  
Lee et al.

(10) Patent No.: US 8,850,340 B2  
(45) Date of Patent: Sep. 30, 2014

(54) MOBILE TERMINAL AND METHOD OF PROVIDING USER INTERFACE USING THE SAME

(75) Inventors: Junghun Lee, Seoul (KR); Moosung Kim, Seoul (KR); Yoomee Song, Seoul (KR)

(73) Assignee: LG Electronics Inc., Seoul (KR)

( * ) Notice: Subject to any disclaimer, the term of this patent is extended or adjusted under 35 U.S.C. 154(b) by 674 days.

(21) Appl. No.: 12/357,480

(22) Filed: Jan. 22, 2009

(65) Prior Publication Data

US 2010/0058211 A1    Mar. 4, 2010

(30) Foreign Application Priority Data

Sep. 4, 2008    (KR) .......................... 10-2008-0087172

(51) Int. Cl.
  *G06F 3/048*    (2013.01)
  *G06F 3/041*    (2006.01)
  *G06F 1/16*    (2006.01)
  *G06F 3/0488*    (2013.01)

(52) U.S. Cl.
  CPC ............ *G06F 3/04886* (2013.01); *G06F 3/041* (2013.01); *G06F 1/1624* (2013.01); *G06F 1/1626* (2013.01); *G06F 1/169* (2013.01); *G06F 1/1643* (2013.01)
  USPC .............................. 715/764; 715/765; 715/778

(58) Field of Classification Search
  CPC .............................. G06F 3/0481; G06F 9/4443
  USPC ............................ 715/864, 762–765; 455/566
  See application file for complete search history.

(56) References Cited

U.S. PATENT DOCUMENTS

| 5,987,325 | A | * | 11/1999 | Tayloe .......................... 455/435.2 |
| 6,459,441 | B1 | * | 10/2002 | Perroux et al. .................. 715/837 |
| 6,912,386 | B1 | * | 6/2005 | Himberg et al. .............. 455/423 |
| 7,086,011 | B2 | * | 8/2006 | Budrys et al. .................. 715/837 |
| 2005/0039142 | A1 | * | 2/2005 | Jalon et al. .................... 715/823 |
| 2006/0150125 | A1 | * | 7/2006 | Gupta et al. ................... 715/864 |
| 2006/0234693 | A1 | * | 10/2006 | Isidore et al. ............... 455/422.1 |
| 2008/0077865 | A1 | * | 3/2008 | Hiles et al. .................... 715/708 |
| 2009/0029736 | A1 | * | 1/2009 | Kim et al. ..................... 455/558 |

FOREIGN PATENT DOCUMENTS

| EP | 2043395 A1 * | 4/2009 |
| KR | 10-2007-0096767 A | 10/2007 |
| KR | 10-0825866 A | 4/2008 |
| WO | WO 02/47412 A1 | 6/2002 |

* cited by examiner

*Primary Examiner* — Tadeese Hailu
(74) *Attorney, Agent, or Firm* — Birch, Stewart, Kolasch & Birch, LLP

(57) ABSTRACT

A mobile terminal including a display configured to display a graphical user interface, a user identification unit configured to connect at least first and second user identification modules to the mobile terminal, in which the first and second user identification modules include first and second telephone numbers, respectively, a memory configured to store at least first and second user interface information corresponding to the first and second user identification modules, respectively, and a controller configured to control the display to display the graphical user interface using the first user interface information when the first user identification module is used and to display the graphical user interface using the second user interface information when the second user identification module is used.

16 Claims, 9 Drawing Sheets

MOBILE TERMINAL AND METHOD OF PROVIDING USER INTERFACE USING THE SAME

CROSS REFERENCE TO A RELATED APPLICATION

This nonprovisional application claims priority under 35 U.S.C. §119(a) to Korean Patent Application No. 10-2008-0087172 filed in the Republic of Korea on Sep. 4, 2008, the entire contents of which are hereby incorporated by reference.

BACKGROUND OF THE INVENTION

1. Field of the Invention

The present invention relates to a mobile terminal and corresponding method of providing different user interfaces for different user identification modules.

2. Description of the Related Art

Terminals such as personal computers, laptop computers, cellular phones and the like are diversified and function as a multimedia player having multiple functions of capturing pictures or moving images, playing music, moving image files and games, and receiving broadcasting programs.

In addition, terminals can be divided into mobile terminals and stationary terminals. Mobile terminals are classified into handheld terminals and vehicle mounted terminals. In addition, because the terminal provides a plurality of different functions, the terminal includes a user interface (UI) that allow the user to operate the terminal.

However, because the mobile terminal generally has a small screen, the UI is also small in size and thus it is difficult to select or activate different functions provided on the terminal.

SUMMARY OF THE INVENTION

Accordingly, one object of the present invention is to address the above-noted and other drawbacks of the related art.

Another object of the present invention to provide a mobile terminal and corresponding method of providing different user interfaces to a plurality of user identification modules such that a user can easily recognize a user identification module related to a currently provided function and/or item.

Yet another object of the present invention to provide a mobile terminal and corresponding method of allowing a user to set a specific user interface for a specific user identification module.

To achieve these and other advantages and in accordance with the purpose of the present invention, as embodied and broadly described herein, the present invention provides in one aspect a mobile terminal capable of mounting a plurality of user identification modules storing different telephone numbers therein, and which includes a memory storing a plurality of pieces of user interface information respectively corresponding to the plurality of user identification modules and a plurality of items respectively related to a plurality of functions provided by the mobile terminal, and a controller providing at least one of the plurality of items together with a user interface according to the user interface information corresponding to the user identification module related to the at least one item among the plurality of user identification module.

Further, the plurality of pieces of user interface information may include information on image characteristic including at least one of a color, a brightness, a saturation, a value and an intensity, information on background images displaying at least one of still images and moving images, and information on audio profiles outputting audio data or may include information on text characteristics including at least one of font and color.

Also, at least one of the plurality of pieces of user interface information and corresponding relationship between the plurality of pieces of user interface information and the plurality of user identification modules may be set or changed by a user.

According to another aspect, the present invention provides a method of providing a user interface in a mobile terminal capable of mounting a plurality of user identification modules therein. The method includes enabling a first function provided by the mobile terminal, and providing at least one item related to the first function together with a user interface according to user interface information corresponding to the user identification module related to the ate least one item among the plurality of user identification modules. Further, a plurality of pieces of user interface information respectively correspond to the plurality of user identification modules.

According to an embodiment of the present invention, a user can easily recognize a related user identification module according to the attribute of a user interface provided together with a currently provided function and/or item. Furthermore, the user can set a specific user interface for a specific user identification module.

In still another aspect, the present invention provides a mobile terminal including a display configured to display a graphical user interface, a user identification unit configured to connect at least first and second user identification modules to the mobile terminal, the first and second user identification modules including first and second telephone numbers, respectively, a memory configured to store at least first and second user interface information respectively corresponding to the first and second user identification modules, respectively, and a controller configured to control the display to display the graphical user interface using the first user interface information when the first user identification module is used and to display the graphical user interface using the second user interface information when the second user identification module is used.

In yet another aspect, the present invention provides a method of controlling a mobile terminal, and which includes connecting at least first and second user identification modules to the mobile terminal, in which the first and second user identification modules including first and second telephone numbers, respectively, storing at least first and second user interface information respectively corresponding to said first and second user identification modules, respectively, and displaying a graphical user interface using the first user interface information when the first user identification module is used and displaying the graphical user interface using the second user interface information when the second user identification module is used.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, the embodiments are provided so that this disclosure will be thorough and complete, and will fully convey the concept of the invention to those skilled in the art.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
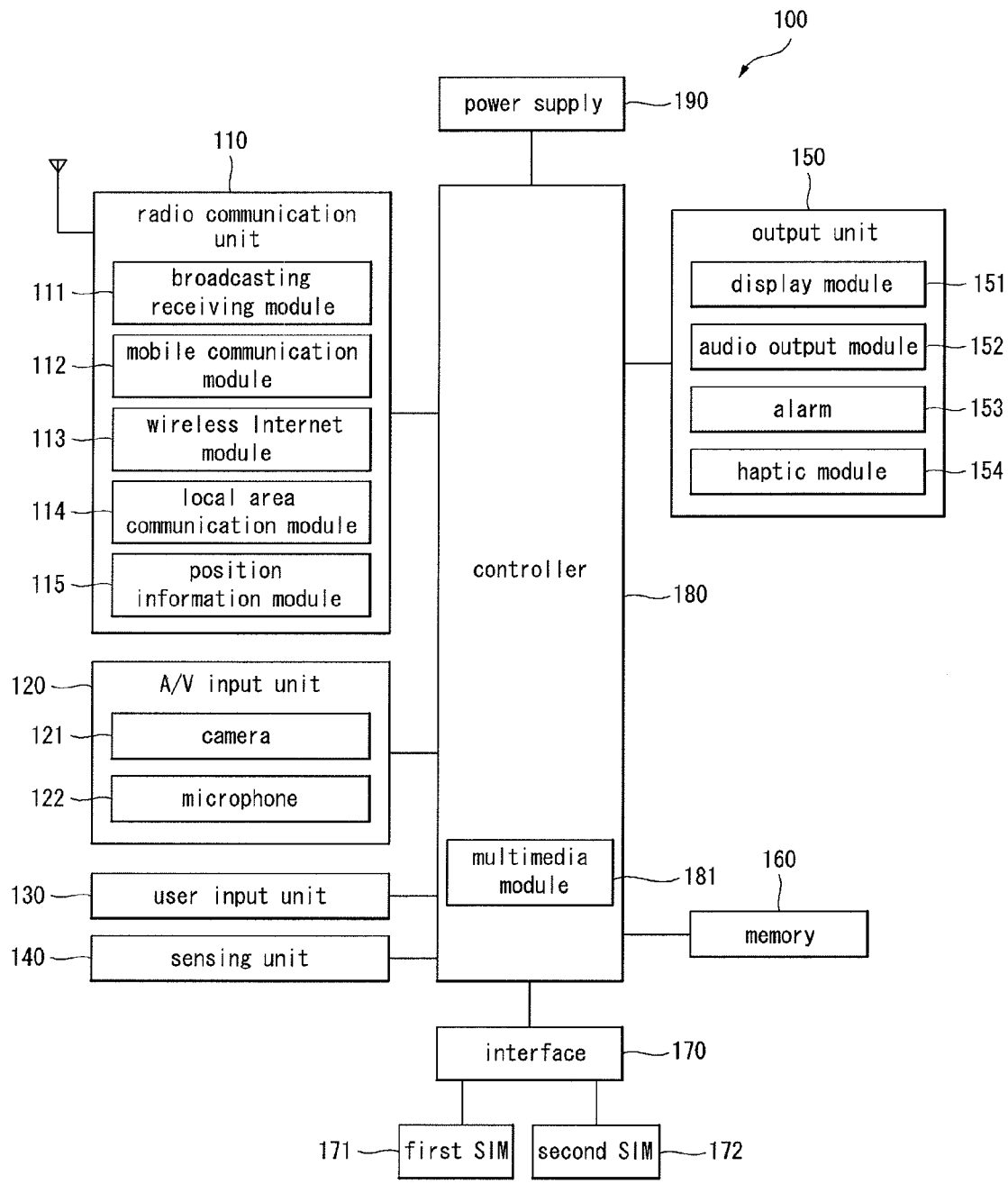
FIG. 1 is a block diagram illustrating a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of a combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

In addition, various embodiments of the present invention can be implemented in a computer or similar device readable recording medium using software, hardware or a combination thereof, for example.

According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
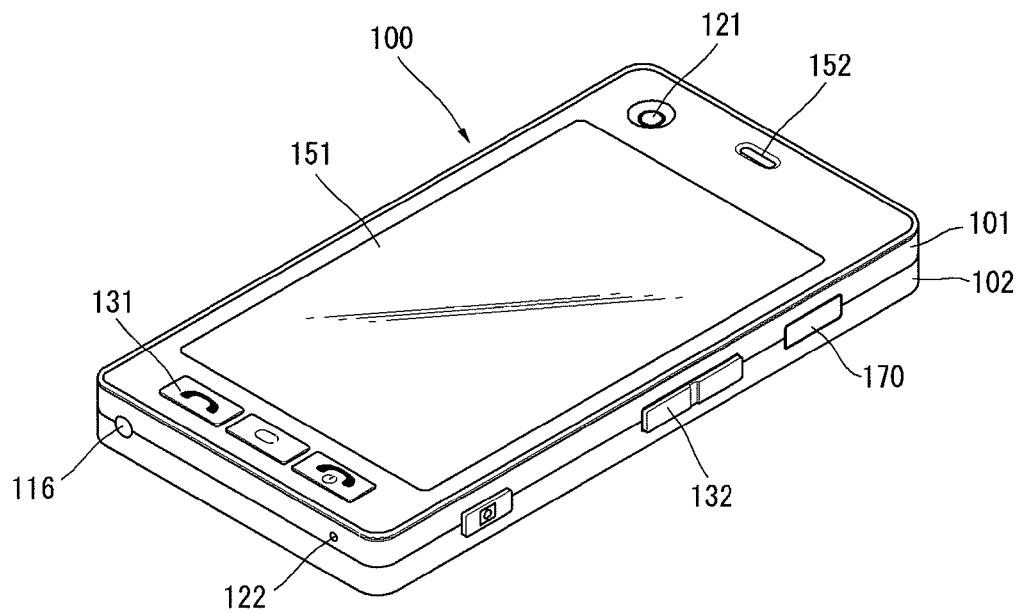
FIG. 2a is a front perspective view illustrating a handheld terminal according to an embodiment of the present invention.

Next, FIG. 2a is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2a, the display unit 151, the audio output unit 152, the camera 121, a user input unit 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple user input units 131 and 132 that are operated to receive commands for controlling the operation of the handheld terminal 100. Further, the user input units 131 and 132 can be referred to as manipulating portions and employ any tactile manner in which a user operates the user input units 131 and 132 while producing a tactile feeling.

Also, the user input units 131 and 132 can receive various inputs. For example, the user input unit 131 receives commands such as start and end a call, and the user input unit 132 receives commands such as to control the volume of the sound output from the audio output unit 152 or to convert the display unit 151 into a touch recognition mode.

Figure 2B:
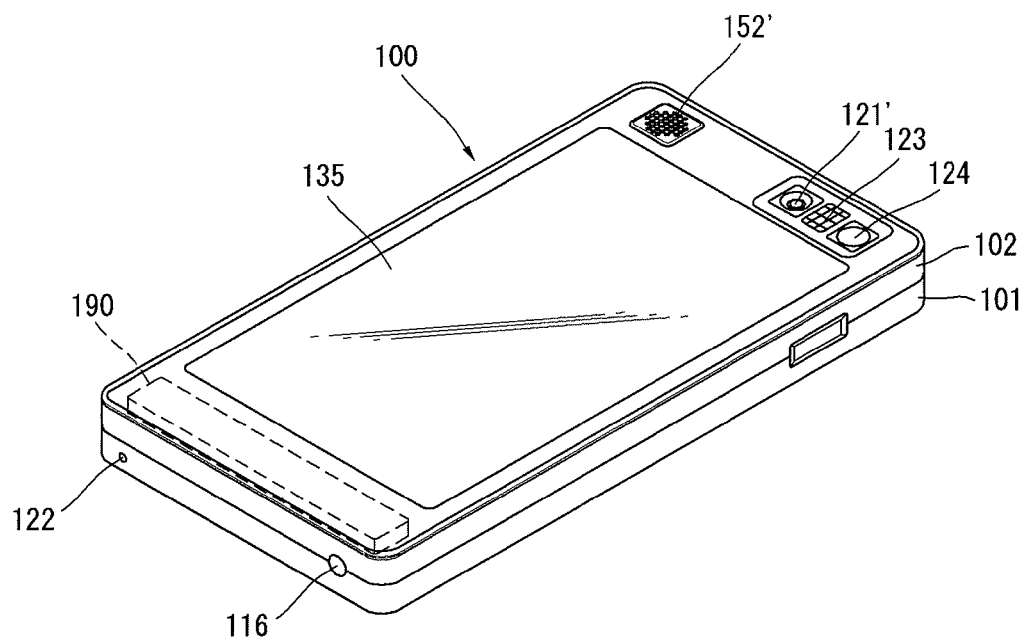
FIG. 2b is a rear perspective view illustrating the handheld terminal shown in FIG. 2A according to an embodiment of the present invention.

Next, FIG. 2b is a rear perspective view of the handheld terminal shown in FIG. 2a according to an embodiment of the present invention. As shown in FIG. 2b, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2a.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2b, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2a and be used in a speaker phone mode when the terminal is used for a telephone call.

A broadcasting signal receiving antenna 116 can also be additionally attached to a side of the terminal body in addition to an antenna for telephone calls (see FIGS. 2a and 2b). The antenna forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2b also illustrates a touch pad 135 for sensing touch additionally attached to the rear case 102 of the terminal 100. Further, the touch pad 135 can be a light transmission type as the display module 151. In this instance, when the display module 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display module 151 behind the display module 151. The touch panel 135 can also be identical to or smaller than the display unit 151 in size.

The interoperations of the display unit 151 and the touch pad 135 will now be described with reference to FIGS. 3a and 3b. In more detail, FIGS. 3a and 3b are front views of the handheld terminal 100 and are used for explaining an operating state of the handheld terminal according to an embodiment of the present invention.

The display module 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
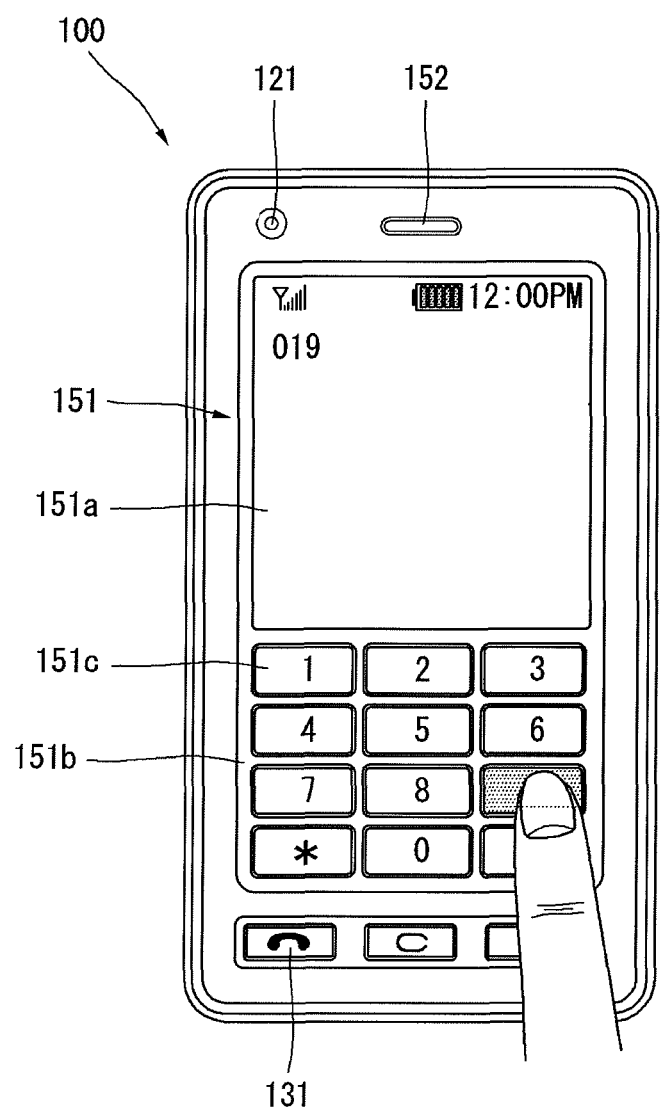
FIGS. 3a and 3b are front views illustrating a handheld terminal for explaining an operation of the handheld terminal according to an embodiment of the present invention.
Figure 3B:
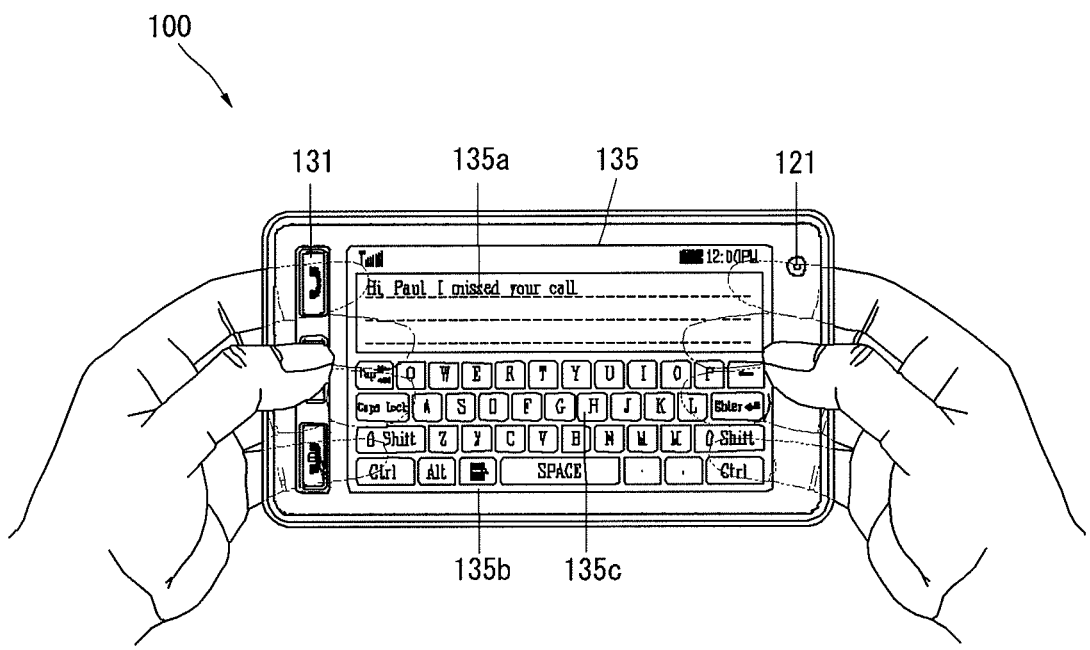

Further, FIG. 3a shows that touch applied to a soft key is input through the front side of the terminal body. The display module 151 can be a single area or can be divided into a plurality of regions. In the latter instance, the display unit 151 is constructed such that the plurality of regions interoperate with each other.

For example, and as shown in FIG. 3a, an output region 151a and an input region 151b are respectively displayed in upper and lower parts of the display module 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first user input unit 131, a connection of a call corresponding to a telephone number displayed on the output region 151a is attempted.

Next, FIG. 3b is an overview of the mobile terminal 100 showing that touch applied to soft keys is input through the rear side of the terminal body. FIG. 3b also shows the landscape of the terminal body while FIG. 3a shows the portrait of the terminal body. In addition, the display unit 151 is constructed such that an output image is converted according to the direction in which the terminal body is located.

Further, FIG. 3b shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

Figure 4:
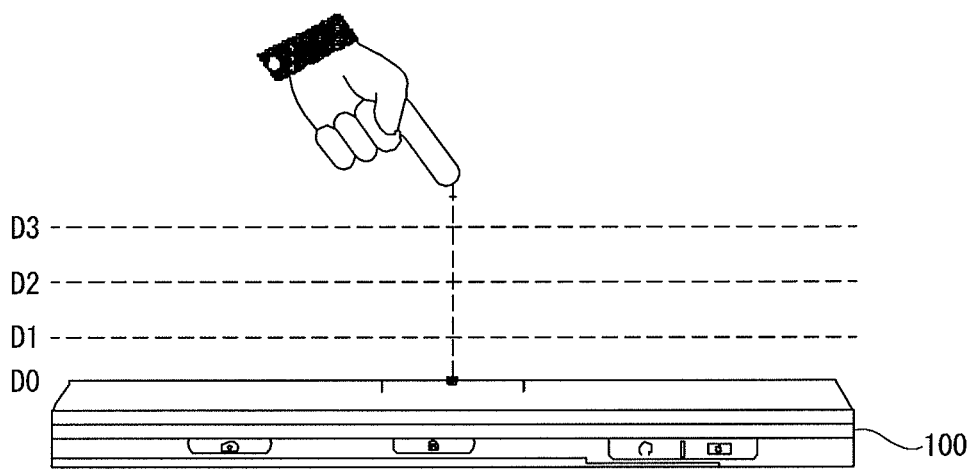
FIG. 4 is a conceptional view for explaining a proximity depth of a proximity sensor.

The proximity sensor described with reference to FIG. 1 will now be explained in more detail with reference to FIG. 4. That is, FIG. 4 is a conceptual diagram used for explaining a proximity depth of the proximity sensor. As shown in FIG. 4, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

In addition, the mobile terminal 100 according to an embodiment of the present invention can include multiple subscriber identify module (SIM) cards. Thus, the user can use different SIM cards, each having a different phone number, to perform different functions on a single terminal.

As mentioned above, the user identification modules can include at least one of UIMS, SIMs and USIMS. In the present description, the mobile terminal 100 is assumed to have the first SIM 171 and the second SIM 172 as the plurality of user identification modules, as shown in FIG. 1.

In addition, the memory 160 stores a plurality of pieces of user interface information, which respectively correspond to the plurality of user identification modules. The memory 160 can also store a database including a corresponding relationship between the user interface information and the user identification modules. The corresponding relationship can also be set or changed by a user. Thus, the mobile terminal 100 according to an embodiment of the present invention can display different user interfaces for different SIM cards, making it easy for the user to clearly see what SIM card is currently being used (or what SIM card is currently not being used).

Figure 5:
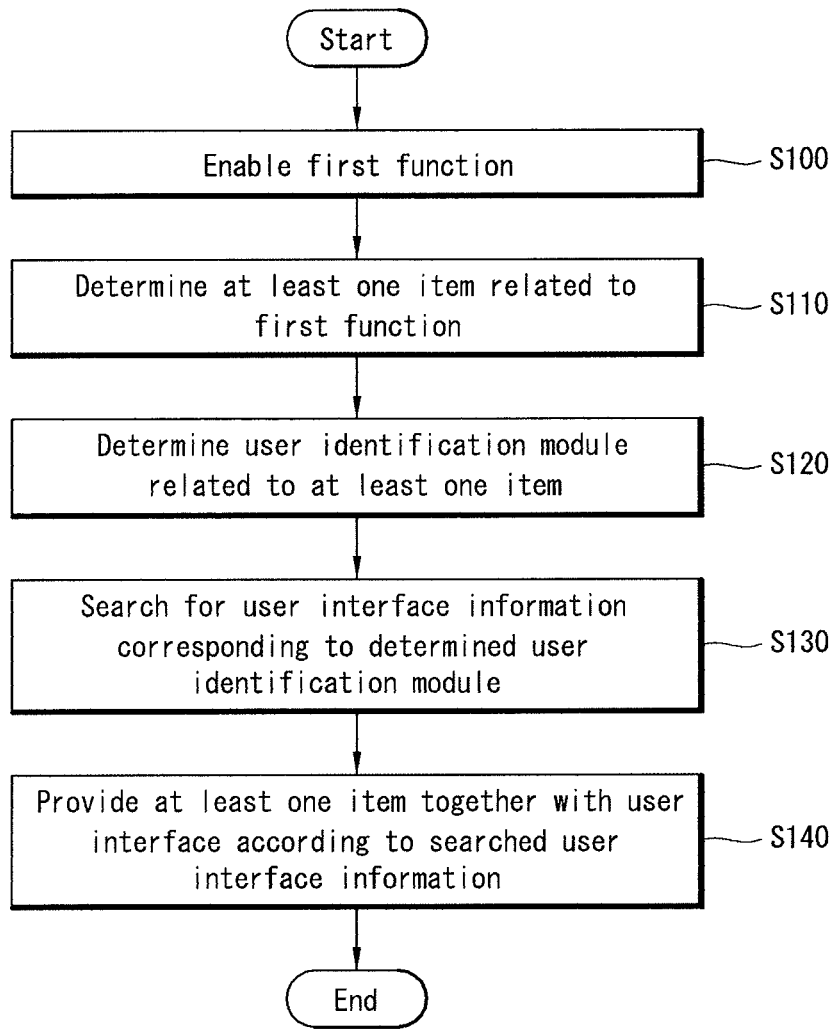
FIG. 5 is a flow chart illustrating a method of providing a user interface in a mobile terminal according to an embodiment of the present invention.

In more detail, FIG. 5 is a flow chart of a method of providing a user interface in a mobile terminal according to a first embodiment of the present invention. FIG. 1 will also be referred to throughout the rest of the description of the present invention. As shown in FIG. 5, the controller 180 enables a first function (step S100).

The first function can be any one of various functions provided by the mobile terminal 100. In addition, the first function can be enabled according to judgment of the controller 180 or executed based on a user inputting a command or other information into the terminal using the user input unit 130.

For example, when a call is received through the mobile communication module 112, the controller 180 can execute a first function corresponding to informing the user of the incoming call. Further, the controller 180 can perform a function of displaying a phonebook on the display unit 151 according to a command signal received through the user input unit 130. The first function enabled in step S100 can also be a plurality of functions including the first function.

The controller 180 then determines at least one item which will be provided in connection with the first function (step S110). For example, when a text message (e.g., SMS message) is received through the mobile communication module 112, the controller 180 determines what icon to use for informing the user about the received text message, and displays the determined icon on the display unit 151.

Next, the controller 180 determines a user identification module related to the first function or the at least one item (step S120). For example, when a SMS is received corresponding to the telephone number stored in the first SIM 171, the controller 180 determines the first SIM 171 as the user identification module related to the at least one item determined in the step S110.

The controller 180 then searches for user interface information corresponding to the user identification module determined in the step S120 with reference to the memory 160 (step S130). For example, the user interface information corresponding to the first SIM 171 can be color information corresponding to the color red.

The controller 180 then provides the at least one item and user interface according to the searched user interface information (step S140). For example, the controller 180 can display a mail icon in the color red on the display unit 151 to inform the user that the SMS message sent to the recipient corresponding to the telephone number stored in the first SIM 161 is received.

Furthermore, when another SMS message sent to a recipient corresponding to the telephone number stored in the second SIM 172 is received, the controller 180 can display the mail icon in the color yellow on the display unit 151.

The controller 180 can also apply the user interface to the at least one item or provide the user interface independently of the at least one item according to the corresponding user interface information in step S140. For example, when the user interface information corresponds to an audio profile, an audio user interface can be provided independently of the at least one item.

Figure 6:
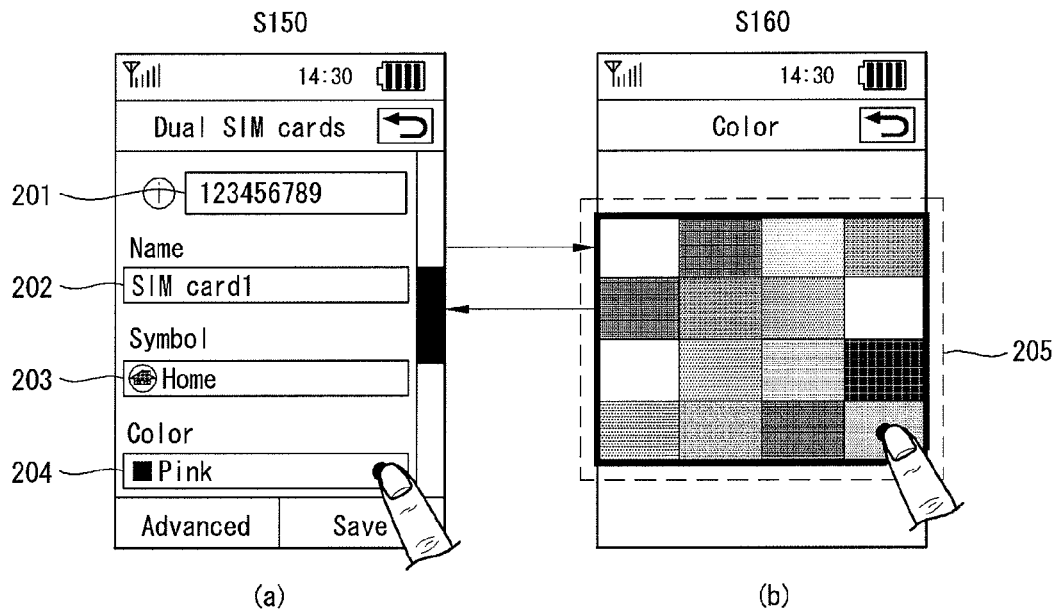
FIG. 6 is an overview of display screens illustrating a user setting user interface information for a first SIM according to an embodiment of the present invention.

Next, FIG. 6 is an overview of display screens showing a user setting user interface information with respect to the first SIM 171. In more detail, FIG. 6(*a*) illustrates a displays screen S150 that displays information 201 and 202 corresponding to the first SIM 171. The reference numeral 201 denotes the telephone number of the first SIM 171, and reference numeral 202 represents that the currently selected user identification module is the first SIM 171. The display screen S150 also includes reference numeral 203 denoting an item to which the user interface information will be applied and reference numeral 204 representing currently selected color information.

In addition, when the user touches the region corresponding to the reference numeral 204 in FIG. 6(*a*), the controller 180 controls the display 151 to display a display screen S160 as shown in FIG. 6(*b*). The user can then select a different color for the first SIM 171 via the display screen S160. In more detail, when the user selects the color "pink" in the color display region 205 in the display screen S160, the color information on the first SIM 171 is set to "pink" as shown in the display screen S150 in FIG. 6(*a*).

Then, the color "pink" becomes the user interface information corresponding to the first SIM 171. The controller 180 also sets the color "pink" as the user interface information corresponding to the first SIM 171 for the item 203 corresponding to "HOME" and stores the user interface information in the memory 160. Then, the controller 180 displays items, data and menus related to the first SIM 171 in the color "pink" when the item 203 corresponding to "HOME" is displayed on the display unit 151.

In addition, the user interface information can be applied to only a specific item such as "HOME" as shown in FIG. 6, or can be applied to all functions and all items provided by the mobile terminal 100. Further, although FIG. 6 shows image characteristic such as color as the user interface information, the present invention is not limited to these characteristics. That is, the characteristics applied to the user interface information can include at least one of image characteristics, audio characteristics, text characteristics and data types.

For example, the user interface information can include information on image characteristic including at least one of a color, brightness, saturation, value and intensity. Furthermore, the user interface information can include information on background images corresponding to still images or moving images. Moreover, the user interface information can include information on audio profiles outputting audio data, and/or information on text characteristics including at least one of fonts and colors.

Figure 7:
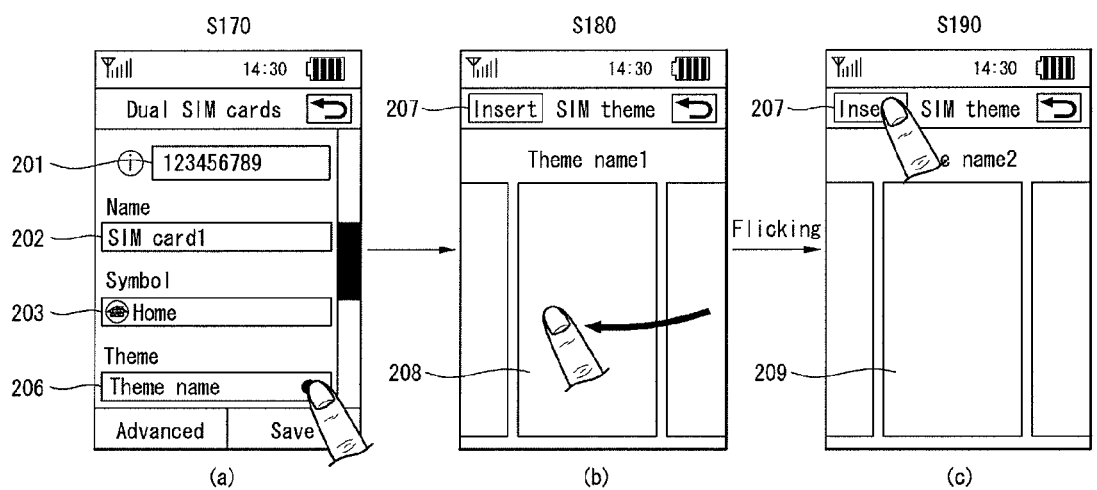
FIG. 7 is an overview of display screens illustrating a user setting user interface information for a first SIM according to another embodiment of the present invention.

Next, FIG. 7 is an overview of display screens showing the user setting user interface information for the first SIM 171 according to another embodiment of the present invention. In this embodiment, the user sets a "theme" for the user interface information.

In more detail, and as shown in the display screen S170 in FIG. 7(*a*), the user sets a specific theme for the first SIM 171 such that the specific theme is provided as a user interface for the first SIM 171. In FIG. 7(*a*), the reference numeral 206 denotes a currently selected user interface theme.

Also, when the user touches the region corresponding to reference numeral 206, the controller 180 displays the display screen S180 for selecting a theme as shown in FIG. 7(*b*). In addition, the reference numeral 207 represents an icon serving as a confirmation button for selecting the currently displayed theme.

As shown in the display screen S180 in FIG. 7(*b*), the user can scroll through different themes to be applied as user interfaces for the first SIM 171. The reference numeral 208 represents a currently viewed theme (the user can select the icon 207 to set the theme 208 as the theme for the user interface).

As shown in FIG. 7(*c*), the controller 180 displays the display screen S190 that includes more themes 209 the user can select. That is, in the embodiment shown in FIG. 7, the user can scroll through different themes using a touch and drag operation or using a flicking operation to view and select a particular theme for the user interface information.

In addition, the theme can be a set of user interface information, which has various objects to which the user interface information will be applied and various attributes of the user interface information. For example, a first theme can have a color "red" and an audio file "first AUDIO.wav" as the user interface information. A second theme can have a color "yellow" for a function "message" and a color "dark yellow" for a function "phonebook" as the user interface information.

In addition, the memory 160 stores the plurality of items respectively related to the plurality of functions provided by the mobile terminal 100. In more detail, the plurality of items can include at least one of a file, a phonebook, a call history and a message. Further, the file can include at least one of a text, a still image and a moving image, the phonebook can have telephone numbers and an address directory, the call history can include at least one of an outgoing call log, an incoming call log and a missed call log, and the message can include at least one of a short message service (SMS) message, a multimedia messaging service (MMS) message and an e-mail. The plurality of items can also include at least one of a menu and an icon.

As described above, embodiments of the present invention provide a user interface for a specific function and/or a specific item provided by the mobile terminal 100 that is set using user interface information corresponding to each user identification module such that the user can easily recognize which user identification module is related to the specific function and/or the specific item.

Furthermore, embodiments of the present invention provide various user interfaces such as video, audio and text and a function of setting the user interfaces such that the user can set a desired user interface for each user identification module. The different embodiments of the present invention will now be explained in more detail.

Figure 8A:
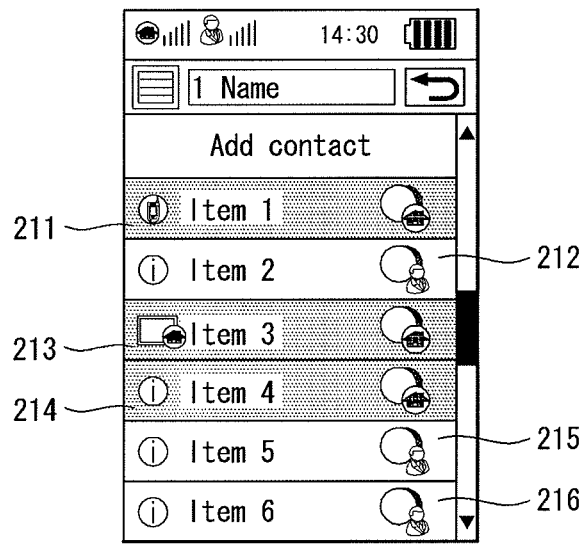
FIGS. 8a, 8b and 8c are overviews of display screens illustrating examples of discriminating user identification modules from each other according to image characteristic according to an embodiment of the present invention.
Figure 8B:
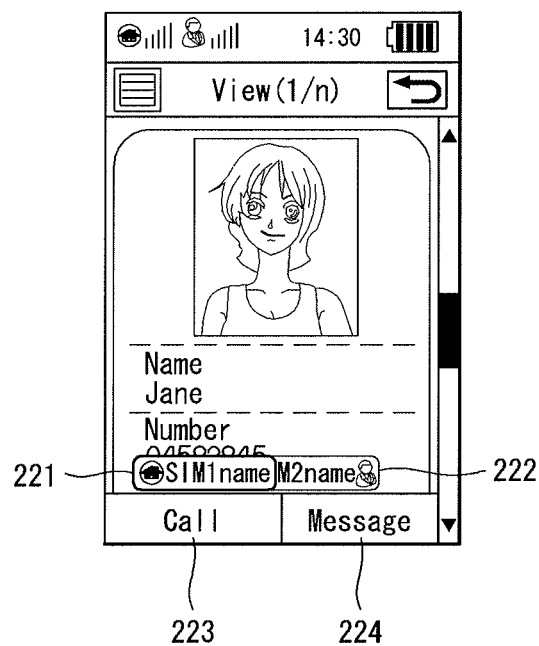
Figure 8C:
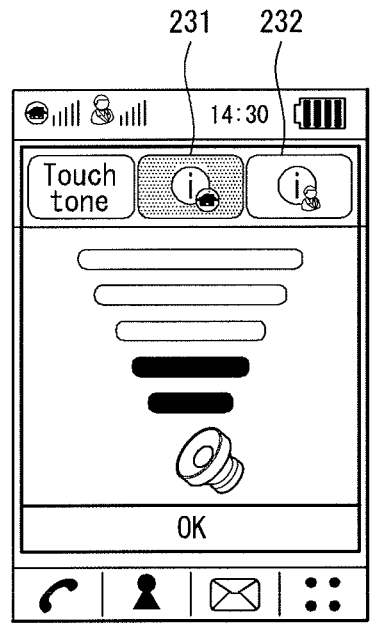

Discrimination between user Identification Modules According to Image Characteristics FIGS. 8*a*, 8*b* and 8*c* are overviews of display screens showing the discrimination of user identification modules from each other using image characteristics according to an embodiment of the present invention. Further, in this embodiment, the memory 160 can store a plurality of pieces of user interface information including information on image characteristics having at least one of a color, a brightness, a saturation, a value and an intensity. In addition, each of the plurality of user identification modules included in the mobile terminal 100 corresponds to one of the plurality of pieces of user interface information and information on the corresponding relationship is stored in the memory 160.

For example, in one embodiment, first user interface information corresponds to the first SIM 171 and second user interface information corresponds to the second SIM 172. The first and second user interface information also has different image characteristics. For example, the first user interface information can include color information corresponding to "pink", and the second user interface information can include color information corresponding to "blue".

Thus, when a specific function and/or a specific item of the mobile terminal 100 is output or provided, the controller 180 can determine which one of the first SIM 171 and the second SIM 172 is related to the function and/or the item. The controller 180 then provides the function and/or the item or a related user interface in the color "pink" when the function and/or the item is determined to be related to the first SIM 171. The controller 180 can also provide the function and/or the item or the related user interface in the color "blue" when the function and/or the item is determined to be related to the second SIM 172.

Further, as described above, the image characteristic can include various items in addition to color. For example, the controller 180 can discriminate between the plurality of user identification modules using different brightnesses or values, for example.

Turning now to FIG. 8a, which is an overview of a display screen including a phonebook list. In FIG. 8a, the Item 1 211, Item 3 213 and Item 4 214 are items related to the first SIM 171 and the Item 2 212, Item 5 215 and Item 6 216 are items related to the second SIM 172. As shown in FIG. 8a, the items related to the first SIM 171 and the items related to the second SIM 172 have different image characteristics. Accordingly, the user can intuitively recognize which item is related to which user identification module.

Next, FIG. 8b is an overview of a display screen showing a user calling a person named "Jane" by selecting a call button 223 or sending a message to "Jane" by selecting a message button 224. The user can also select the telephone number of the first SIM 171 by selecting a first icon 221 and the telephone number of the second SIM 172 by selecting a second icon 222. Further, the controller 180 can display the first icon 221 for selecting the first SIM 171 and the second icon 222 for selecting the second SIM 172 in different colors on the display 151.

Next, FIG. 8c is an overview of a display screen showing the setting of the volume of reception bells when a call is received. In addition, according to an embodiment of the present invention, the user can advantageously set the volume of a call reception bell for a recipient corresponding to the telephone number of the first SIM 171 to be different from the volume of a call reception bell for a recipient corresponding to the telephone number of the second SIM 172.

In more detail, as shown in FIG. 8c, the user can touch or select a tab 231 to set a reception volume for calls corresponding to the first SIM 171 or select a tab 232 to set a reception volume for calls corresponding to the second SIM 172. The controller 180 can also display the tabs 231 and 232 in a color corresponding to the color used for the interfaces of the two different SIM cards.

Figure 9A:
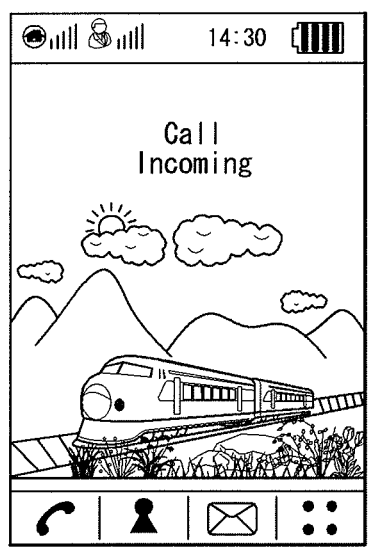
FIGS. 9a and 9b are overviews of display screens illustrating examples of discriminating user identification modules from each other according to background images according to an embodiment of the present invention.
Figure 9B:
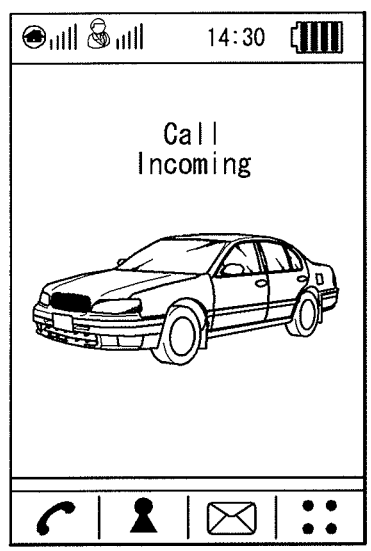

Discrimination Between user Identification Modules According to Background Images FIGS. 9a and 9b are overviews of display screens showing user identification modules being discriminated from each other using different background images according to an embodiment of the present invention. In more detail, in this embodiment, the user can set user interface information having different background images for a plurality of user identification modules.

For example, FIG. 9a illustrates a background image or screen of a traveling train that is displayed when an incoming call is received from the first SIM 171, and FIG. 9b illustrates a background image or screen of a traveling car that is displayed when an incoming call is received from the second SIM 172. Thus, as shown FIGS. 9a and 9b, the background image is varied according to the telephone number for which a call is received.

Therefore, the user can easily recognize which one of the telephone numbers of the first SIM 171 and the second SIM 172 corresponds to the currently received call. Further, the background image can include at least one of a still image, a moving image, animation and flash, for example.

Discrimination Between user Identification Modules According to Audio Profiles

According to another embodiment of the present invention, user interface information having different audio profiles can be set for a plurality of user identification modules. For example, when the user touches the first tab 231 shown in FIG. 8c, the controller 180 can output or play a file called "first AUDIO.wav" through the audio output module 152. Similarly, when the user touches the second tab 232, the controller 180 can output or play a different file called "second AUDIO.wav" through the audio output module 152. Thus, the user can recognize the currently activated user identification module through audio information corresponding to the user identification module.

Discrimination Between user Identification Modules According to Text Characteristics In yet another embodiment of the present invention, different text characteristics including font and color can be respectively set for the plurality of user identification modules. For example, in FIG. 8a, the Item 1 211, Item 3 213 and Item 4 214 can be displayed in an "Italic" font, and the Item 2 212, Item 5 215 and Item 6 216 can be displayed in a "Gothic" font, for example. Thus, the user can recognize which user identification module is related to the currently provided function and item through the font and/or color of the text corresponding to the function and item.

In addition, the above described method for providing different user interface information for different SIMS can be written as computer programs and can be implemented in general-use digital computers that execute the programs using a computer readable recording medium.

The method can also be executed through software. That is, code segments can be developed to perform the different features of the present invention. The programs or code segments can also be stored in a processor readable medium and transmitted according to computer data signals combined with carriers in a transmission medium or a communication network.

Further, the computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising:
a display configured to display a graphical user interface;
a user identification unit configured to connect at least first and second user identification modules to the mobile terminal, said first and second user identification modules including first and second telephone numbers, respectively;
a memory configured to store at least first and second user interface information corresponding to said first and second user identification modules, respectively; and
a controller configured to:
set first and second user interface information,
wherein the first and second user interface information are related to content display characteristics including at least one of color, brightness, saturation, intensity, theme, background image or font, and audio output characteristics including at least one of audio profile or audio volume, and
wherein the first user interface information is different from the second user interface information,
selectively construct a first content display screen and a first output audio based on the first user interface information when a specific event is performed through the first identification module, or a second content display screen and a second output audio based on the second user interface information when the specific event is performed through the second identification module,
wherein the first content display screen, the first audio, the second content display screen and the second audio correspond to the specific event, and
output one of the first content display screen and first output audio or the second content display screen and second output audio, based on whether the specific event is performed through the first identification module or through the second identification module.

2. The mobile terminal of claim 1, wherein the first and second user interface information include different image characteristics including at least one of a different color, a different brightness, a different saturation, a different image characteristic value and a different intensity.

3. The mobile terminal of claim 1, wherein the first and second user interface information include information corresponding to different background images.

4. The mobile terminal of claim 1, wherein the first and second user interface information include different audio outputting profiles for outputting different audio data.

5. The mobile terminal of claim 1, wherein the first and second user interface information include different text characteristics including at least one of a different font and a different color.

6. The mobile terminal of claim 1, wherein the specific event is executing at least one of a file function, a phonebook function, a call history function and a message function.

7. The mobile terminal of claim 1, wherein the first and second user interface information include information corresponding to different menus.

8. The mobile terminal of claim 1, further comprising:
an input unit configured to select characteristics of the first user information for the first user identification module and to select characteristics of the second user information for the second identification module.

9. A method of controlling a mobile terminal, the method comprising:
connecting at least first and second user identification modules to the mobile terminal, said first and second user identification modules including first and second telephone numbers, respectively;
storing at least first and second user interface information corresponding to said first and second user identification modules, respectively;
setting first and second user interface information,
wherein the first and second user interface information are related to content display characteristics including at least one of color, brightness, saturation, intensity, theme, background image or font, and audio output characteristics including at least one of audio profile or audio volume, and
wherein the first user interface information is different from the second user interface information,
selectively constructing a first content display screen and a first output audio based on the first user interface information when a specific event is performed through the first identification module, or a second content display screen and a second output audio based on the second user interface information when the specific event is performed through the second identification module,
wherein the first content display screen, the first audio, the second content display screen and the second audio correspond to the specific event; and
outputting one of the first content display screen and first output audio or the second content display screen and second output audio, based on whether the specific event is performed through the first identification module or through the second identification module.

10. The method of claim 9, wherein the first and second user interface information include different image characteristics including at least one of a different color, a different brightness, a different saturation, a different image characteristic value and a different intensity.

11. The method of claim 9, wherein the first and second user interface information include information corresponding to different background images.

12. The method of claim 9, wherein the first and second user interface information include different audio outputting profiles for outputting different audio data.

13. The method of claim 9, wherein the first and second user interface information include different text characteristics including at least one of a different font and a different color.

14. The method of claim 9, wherein the specific event is executing at least one of a file function, a phonebook function, a call history function and a message function.

15. The method of claim 9, wherein the first and second user interface information include information corresponding to different menus.

16. The method of claim 9, further comprising:
selecting characteristics of the first user information for the first user identification module and selecting characteristics of the second user information for the second identification module.

* * * * *